(12) United States Patent
Bouix et al.

(10) Patent No.: US 8,522,795 B2
(45) Date of Patent: Sep. 3, 2013

(54) UNIVERSAL DOCKING STATION COMPACT

(75) Inventors: Herve F. Bouix, New York, NY (US); Christophe Jacob, Saint Denis le Thiboult (FR)

(73) Assignee: ELC Management, LLC, New York, NY (US)

( * ) Notice: Subject to any disclaimer, the term of this patent is extended or adjusted under 35 U.S.C. 154(b) by 25 days.

(21) Appl. No.: 13/100,723

(22) Filed: May 4, 2011

(65) Prior Publication Data

US 2012/0279516 A1 Nov. 8, 2012

(51) Int. Cl.
| | |
|---|---|
| *A45D 42/02* | (2006.01) |
| *A45D 7/02* | (2006.01) |
| *A45D 40/24* | (2006.01) |
| *A45D 40/26* | (2006.01) |
| *A45D 33/28* | (2006.01) |
| *A45C 11/26* | (2006.01) |
| *B65D 69/00* | (2006.01) |
| *B65D 71/00* | (2006.01) |
| *G06F 13/32* | (2006.01) |
| *G06F 1/16* | (2006.01) |
| *H02J 7/00* | (2006.01) |
| *H05K 7/00* | (2006.01) |
| *H05K 5/00* | (2006.01) |

(52) U.S. Cl.
USPC ........... 132/301; 132/212; 132/317; 132/218; 132/297; 206/349; 206/581; 710/303; 320/114; 361/679.4

(58) Field of Classification Search
USPC ................. 132/301, 218, 212, 333, 271, 269, 132/286, 287, 288, 290, 291, 293, 294, 304, 132/312, 314, 315–318, 320, 295, 297; D28/78, D28/82, 83, 91; 206/349, 581, 823, 235, 206/701, 562, 564, 38; 455/556.1, 556.2, 455/573; 710/303; 219/209; 320/114, 116, 320/166; 361/679.4, 679.41–679.45
See application file for complete search history.

(56) References Cited

U.S. PATENT DOCUMENTS

| | | | | | |
|---|---|---|---|---|---|
| 3,179,891 | A | * | 4/1965 | Sharma | 455/231 |
| 4,126,145 | A | | 11/1978 | Boyd | |
| 4,478,330 | A | * | 10/1984 | Lin | 206/38 |

(Continued)

FOREIGN PATENT DOCUMENTS

| | | | |
|---|---|---|---|
| KR | 2002045762 A | * | 6/2002 |
| KR | 20-0352861 | | 6/2004 |
| KR | 20100029499 | | 3/2010 |

OTHER PUBLICATIONS

PCT International Search Report; International Application No. PCT/US2012/036170; Completion Date: Nov. 28, 2012; Mailing Date: Nov. 28, 2012.

(Continued)

*Primary Examiner* — Vanitha Elgart
(74) *Attorney, Agent, or Firm* — Peter Giancang (57) ABSTRACT

A cosmetic compact that is capable of serving as a docking station for an assortment of power transfer, data transfer, and signal transfer connections. In general, power, data, and signal transfer connections will be of the input and output type, with respect to the compact. The compact docking station is able to provide power on an as needed basis or may be used to recharge one or more portable devices. A Universal Docking Station Compact according to the present invention is characterized by an assortment of power and data interfaces.

14 Claims, 9 Drawing Sheets

(56) References Cited

U.S. PATENT DOCUMENTS

| | | | |
|---|---|---|---|
| 4,555,020 A * | 11/1985 | Campello et al. | 206/235 |
| 5,174,440 A * | 12/1992 | Chiu | 206/38 |
| 5,605,167 A | 2/1997 | Montoli | |
| 5,638,838 A | 6/1997 | Lombardi | |
| 5,772,036 A * | 6/1998 | Muncy et al. | 206/581 |
| 5,832,941 A * | 11/1998 | Murillo | 132/316 |
| 5,842,486 A | 12/1998 | Davis et al. | |
| 6,002,651 A | 12/1999 | Baccaray | |
| 6,199,559 B1 | 3/2001 | Nikolaus et al. | |
| 6,227,208 B1 | 5/2001 | Imbert | |
| 6,311,077 B1 | 10/2001 | Bien | |
| 6,768,634 B2 * | 7/2004 | Kim | 361/679.09 |
| 6,769,438 B2 | 8/2004 | Fraillon | |
| 6,788,919 B2 * | 9/2004 | Watanabe | 455/90.3 |
| 6,792,306 B2 * | 9/2004 | Henley et al. | 604/20 |
| 7,054,668 B2 * | 5/2006 | Endo et al. | 455/566 |
| 7,146,184 B1 * | 12/2006 | Tsitsiashvili | 455/550.1 |
| 7,146,667 B2 * | 12/2006 | Elsener | 7/118 |
| 7,340,238 B2 * | 3/2008 | Napier-Clark | 455/347 |
| 7,347,325 B2 * | 3/2008 | O'Neill et al. | 206/449 |
| 7,431,161 B2 * | 10/2008 | Carlino | 206/581 |
| 7,440,269 B2 * | 10/2008 | Liao et al. | 361/679.55 |
| 7,696,728 B2 * | 4/2010 | Cross et al. | 320/166 |
| 7,944,689 B2 * | 5/2011 | Nelson | 361/679.55 |
| 7,984,804 B2 * | 7/2011 | Lebauer | 206/320 |
| 8,238,084 B2 * | 8/2012 | Chen et al. | 361/679.14 |
| 8,267,605 B2 * | 9/2012 | Bouix et al. | 401/1 |
| 8,276,599 B2 * | 10/2012 | Gindi | 132/315 |
| 2004/0017682 A1 | 1/2004 | Baskies | |
| 2004/0096258 A1 * | 5/2004 | Kim | 401/1 |
| 2004/0200497 A1 * | 10/2004 | Thorpe et al. | 132/287 |
| 2004/0221866 A1 | 11/2004 | Greenfield | |
| 2005/0284497 A1 | 12/2005 | Chavez et al. | |
| 2006/0042971 A1 * | 3/2006 | Holmes et al. | 206/235 |
| 2007/0017848 A1 * | 1/2007 | Sasaki | 206/581 |
| 2007/0056603 A1 * | 3/2007 | Huh | 132/294 |
| 2007/0097615 A1 | 5/2007 | Liao et al. | |
| 2007/0136964 A1 * | 6/2007 | Dawley | 15/22.1 |
| 2007/0186948 A1 * | 8/2007 | Kim et al. | 132/218 |
| 2007/0273331 A1 | 11/2007 | Cross et al. | |
| 2008/0138138 A1 * | 6/2008 | Gueret | 401/24 |
| 2009/0165811 A1 * | 7/2009 | Zimmerman | 132/203 |
| 2010/0177476 A1 * | 7/2010 | Hotelling et al. | 361/679.41 |
| 2010/0281636 A1 * | 11/2010 | Ortins et al. | 15/4 |
| 2011/0015652 A1 * | 1/2011 | Sladecek | 606/133 |
| 2011/0089077 A1 * | 4/2011 | Ziemba | 206/570 |
| 2011/0089078 A1 * | 4/2011 | Ziemba | 206/570 |
| 2011/0303565 A1 * | 12/2011 | DuPont et al. | 206/235 |
| 2012/0192893 A1 * | 8/2012 | Anderson | 132/219 |

OTHER PUBLICATIONS

PCT Written Opinion of the International Searching Authority; International Application No. PCT/US2012/036170; Completion Date: Nov. 28, 2012; Mailing Date: Nov. 28, 2012.

* cited by examiner

UNIVERSAL DOCKING STATION COMPACT

FIELD OF THE INVENTION

The invention is in the field of cosmetic compacts, specifically cosmetic compacts adapted for digital communications and digital media consumers.

BACKGROUND

Cosmetic compacts are well known. Typically, a cosmetic compact houses one or more cosmetic products, and auxiliary aids, such as a mirror or an applicator.

Cosmetic compacts that house a power source are known. For example, US2004/0017682 discloses a makeup compact case having light emitting diodes which are powered by a low-voltage lithium battery operated by a switch. U.S. Pat. No. 6,311,077 discloses a combined cosmetic compact and cell phone. The flip open type cell phone has recessed surfaces for holding cosmetic receptacles and an applicator. The cell phone display is able to operate in either of two modes: as a mirror or as a digital display.

The proliferation of portable digital electronic devices and handheld convenience appliances (a.k.a. "handhelds") that require power is tremendous. The number and types of portable devices and appliances that people are carrying on their person as they travel is growing constantly. Some examples that may be named are personal digital assistants, personal media players, cell phones, tablet computing devices, GPS devices, cameras and video game platforms. All of these require an external power source, either to power operations directly or to recharge an integrated battery.

For a long time, women have been carrying cosmetics and cosmetic devices, in a handbag, for example. Recently, there has been interest in portable cosmetic devices that consume power and convert it into another form, such as vibration, heat or light, etc. For example, vibrating mascara applicators are known; as are heated cosmetic applicators.

The increase in the availability and use of portable devices that require a power source presents a problem. For one, the number of items in a woman's handbag keeps going up. Second, each electronic portable device has associated hardware for recharging the device. A woman may not want to have carry that hardware around as well. And even if she does, there is not necessarily a convenient place to plug it in, and if there is, the device is no longer portable while it is plugged in. The solution to the problem is to replace an item that many women already carry around with them, with a portable device according to the present invention that is able to power, recharge, interface with, and effect data transfer between a myriad of personal digital devices and electronic cosmetic appliances, all while being carried on one's person. By replacing the traditional cosmetic compact with a Universal Docking Station Compact according to the present invention, the problems associated with the proliferation of power hungry portable devices may be greatly alleviated.

SUMMARY

The problems and inconveniences associated with the proliferation of power hungry portable devices is addressed by a cosmetic compact that is capable of serving as a docking station for an assortment of power transfer, data transfer, and signal transfer connections. In general, power, data, and signal transfer connections will be of the input and output type, with respect to the compact. The compact docking station is able to provide power on an as needed basis or may be used to recharge one or more portable devices. A Universal Docking Station Compact according to the present invention is characterized by an assortment of power and data interfaces.

DETAILED DESCRIPTION

Throughout this specification, the terms "comprise," "comprises," "comprising" and the like shall consistently mean that a collection of objects is not limited to those objects specifically recited.

Conventional cosmetic compacts are convenient, functional and secure, while also being visually appealing. The latter is an important feature in a retail environment. Cosmetic compacts are dimensioned to be held in one hand during use, and may be square, rectangular, oval, circular, spherical or other regular or irregular shape. There is no industry definition, but in keeping with the idea of compact, we observe that many cosmetic compacts have a largest lateral dimension of about 30 mm to about 150 mm, and a height of less than about 30 mm. For example, a portable DVD player with a 7 inch screen could not be fit into this definition of a cosmetic compact. Preferably, the largest lateral dimension is about 150 mm, more preferably about 125 mm, even more preferably about 100 mm.

Preferably, a cosmetic compact according to the present invention has an appearance that is reminiscent of a conventional cosmetic compact. For illustration purposes, we embody the present invention as a type of compact wherein the width and depth of the compact are larger than the height of the compact. This type of cosmetic compact is relatively flat and planar, and easy to describe in terms of the current invention. Such compacts typically comprise a base and a cover that are capable of orienting with respect to each other, via a hinge or pivot mechanism. Cosmetic compacts that have more than two pivoting members and/or more than one hinge, are also known, but without loss of generality, we describe the present invention in terms of a compact that has exactly two pivoting members, a base (or base member) and a cover (or cover member).

The Base

Figure 1:
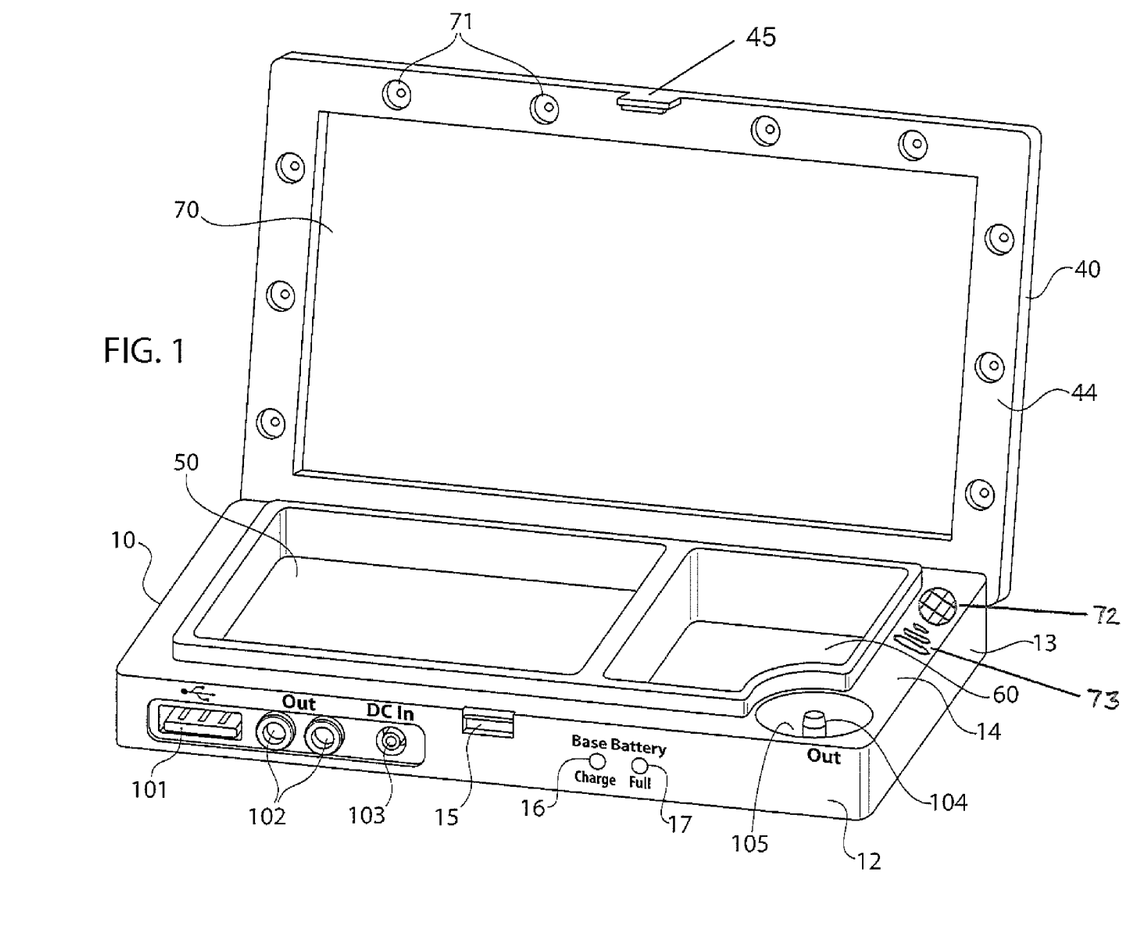
FIG. 1 is a front perspective view of one embodiment of a Universal Docking Station Compact according to the present invention.
Figure 2:
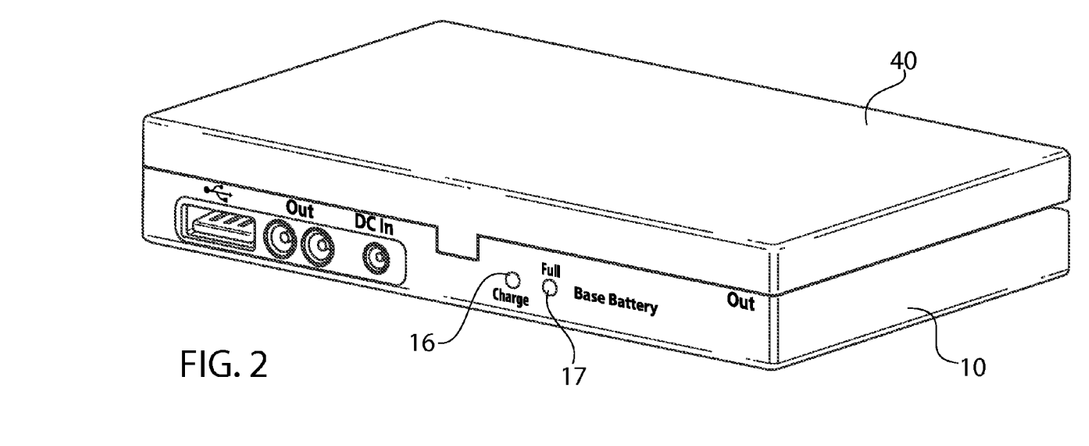
FIG. 2 shows the compact of FIG. 1 closed.
Figure 3:
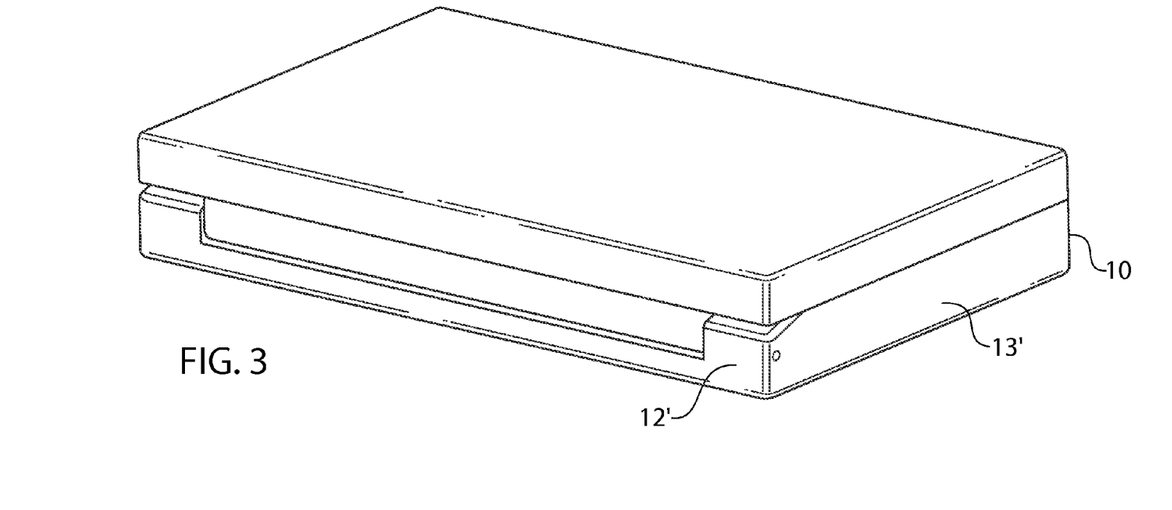
FIG. 3 shows the compact of FIG. 2 from the back.

Referring to FIGS. 1-3, the base (10) is, generally, the largest or main component of the compact. Though shown in an essentially rectangular shape, the principles of the present invention may be manifested in a base that is very different from rectangular. In general, the base has a bottom wall (not visible), front and back walls (12, 12') and two lateral walls (13, 13'). It is convenient to refer to the horizontal dimension associated with the front and/or back walls as the width of the compact. Likewise, the horizontal dimension associated with the lateral walls will be referred to as the depth of the compact.

A top surface (14) of the base (10) is opened to receive one or more cosmetic or dermatological preparations and/or ancillary articles. The interior of the base may be divided into sections. For example, in FIG. 1, there is a section for receiving a powder receptacle or pan (50) and a section for holding an applicator (60). The number of sections is limited by the size of the articles housed in the compact and the overall dimensions of the compact. The base may also house a circuit board and power source, preferably under the one or more sections, out of view. The base will ordinarily be fashioned from one or more plastics, by any conventional means, or formed of metal for a more upscale presentation.

The Cover

A cover (40) according to the present invention, is pivotally attached to the base (10), preferably near the back wall (12') of the base. The cover is moveable with respect to the base, between an opened position and a closed position. In the closed position the cover lays on top of the base, or perhaps, just inside the top of the base. In this position, the cover protects the contents of the base, and the contents of the base are not generally accessible. In the closed position, the cover reduces the occurrence of cosmetic dry-out, contamination or spill. In the opened position, the contents of the base are generally accessible. The cover will ordinarily be fashioned from one or more plastics, by any conventional means, but may also be metallic or partially metallic. Compacts of this type are suitable for storing powders, foundations, eye shadows, blushes, mascara, lip makeup and other products.

The cover (40) has an interior surface (44) which may be capable of supporting one or more cosmetic or dermatological preparations and/or ancillary articles. For example, in FIG. 1, a mirror (70) is mounted on the interior surface of the cover, as well as several light sources, such as light emitting diodes (71) oriented to shine light on the face of a user when looking in the mirror. In cosmetic compacts, a mirror is often provided on the interior surface of the cover, so as to be visible by a user when the compact is open. A mirror, thus located in the cover, gives the user the option of holding the compact and mirror in one hand, while manipulating an applicator in the other hand. Alternatively, a mirror may be located on any interior or exterior surface of the compact, as convenience dictates.

As noted, the cover (40) is pivotally attached to the base (10), preferably near the back wall (12') of the base. For example, the base-to-cover attachment may comprise a hinge that has an elongated pin or axis. Without lose of generality, throughout the specification, "hinge" will refer to any type of connection that facilitates a relative rotation between members of the compact. The range of motion of the cover relative to the base may be from about 90° to about 360°, although special hinge mechanisms are generally required for rotations approaching 270°. Cosmetic compacts that rotate at least 180° may lie flat, which may be an advantage where stability is a factor. For example, sometimes an opened compact is top-heavy and the base, placed on a surface, will not lay flat when the cover is rotated beyond some tipping point. In this case, it may be convenient to "unfold" the compact, to cause both the base and the cover to lie flat. Compacts which cannot lie flat on a surface may, therefore, be disadvantaged.

On a side of the compact without the hinge (for example, the side opposite the hinge), a latch mechanism is sometimes provided to prevent the compact from opening inadvertently. For example, a first portion (15) of the latch mechanism may be associated with the base (10), and a second portion (45) may be associated with the cover (40), so that when the first and second portions are engaged to each other, the base and cover are in a closed and locked configuration.

Optionally, indicator lights may be provided on the compact, for example on the front wall (12) or cover (40) of the compact. In FIG. 2, for example, when lit, indicator light (16) alerts the user that a plugged in device is being charged. When lit, indicator light (17) alerts a user that the base itself has a full charge. Various uses of indicator lights and their associated meanings will be apparent to a person of ordinary skill in the art.

Power Transfer/Data Transfer Interfaces

A Universal Docking Station Compact of the present invention is characterized by an assortment of power, data, and/or signal interfaces that are accessible on or at a surface of the compact. Some interfaces may be accessible when the compact is opened or closed and some may be accessible only when the compact is opened. Preferably, at least some interfaces are accessible when the compact is closed. In some embodiments of the invention, the compact cannot be closed when one or more of the interfaces are engaged in their intended manner.

Some of these interfaces take the form of power transfer connections, data transfer connections and/or signal transfer connections to an assortment devices that require such service. Thus, a compact according to the present invention is able to serve as a universal docking station for an assortment of cosmetic, personal care and consumer handheld devices. Some other interfaces of the compact may facilitate a direct connection between the compact and a human user (through physical contact, for example), by which information or data is conveyed between the user and the compact.

In general, power transfer and data transfer connections will be of the input and output type, with respect to the compact. That is, an input connection facilitates the flow of electrical power or data from the exterior of the compact to the interior of the compact. An output connection facilitates the flow of electrical power or data from the interior of the compact to the exterior of the compact. Some connections may be capable of facilitating the flow of electrical power only, or data only, while other connections may be capable of facilitating the flow of electrical power and data, either in parallel or serially. A particular power connection may be able to recharge one or more portable devices, so that a device can be used after it is detached from the compact. Alternatively, a particular power connection may be able to supply power for immediate consumption, while the device is still attached to the compact. Alternatively, a particular power connection may be able to recharge a device, while simultaneously providing to the same device, power for immediate consumption.

In general, power and data connections are formed as two mating connectors, a male (plug) and a female (jack or port). When we say that two connectors interface, we mean that the connectors are properly mated for their intended purpose and the connection is effective for the intended purpose. For example, plugging a banana plug into a USB port does not create an interface. Connectors of either type may be accessible at any surface of the compact that is convenient. In FIG. 1, for example, four connectors are accessible through the front wall (12) of the base (10). These may be, for example, a bi-directional female USB port (101), two output TS jacks (102), and one input banana jack (103), for DC power. In practice, all or most of the connectors will be accessible through the base, as this arrangement may offer greater stability, but this is not essential, and one or more connectors may be accessible through a surface of the cover (40). Likewise, access to ports or jacks could jut as well have been incorporated into the back wall (12') or side walls (13, 13') of the base.

Figure 4:
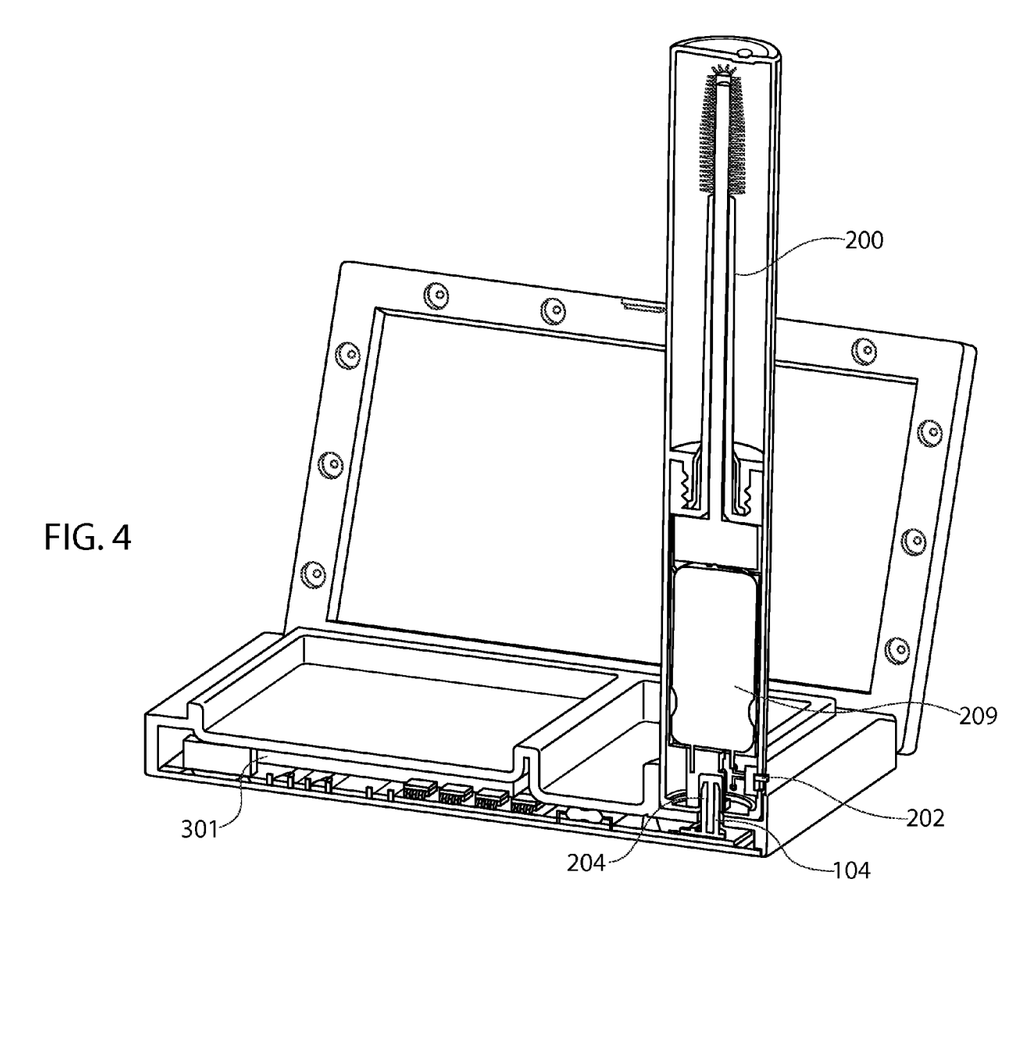
FIG. 4 shows a heated mascara applicator drawing power form the compact.

Some connectors may be accessible, when the cover (40) is opened or closed, and some may be accessible only when the cover is in an opened position. For example, in FIG. 1, a male output power plug (104) is accessible at the top surface (14) of the base (10). That male plug (for example, a TS plug) is designed to fit into a mated female port (204 in FIG. 4) accessible through a surface of a cosmetic article (for example, TS jack). FIG. 4 shows this arrangement for a heating mascara applicator (200). In this and some other embodiments, the compact cannot assume a closed position when one or more of the interfaces are engaged in their intended manner, because the position of the interfacing article prevents the cover from fully closing.

In some embodiments, one or more connectors are able to assume at least two positions with respect to the compact. For example, a connector may be stored within the compact when not in use, and moved to an accessible position when needed. A flip-type or switch-blade type male USB connector is one example of this.

We conceive that any known type of power, data or signal connector may be incorporated into the design of a cosmetic compact according to the present invention, as well as any custom designed connector. In general, power and data connectors may include: modular connectors, such as a Registered Jack connector (i.e. phone jack, Ethernet jack); Pin-out connectors, such as D-subminiature (i.e. VGA), mini-VGA, DIN, mini-DIN (i.e. S-video), DVI, mini-DVI, micro-DVI, D SCART (EIA Multiport), D-terminal (D-tanshi), APPLE™ Attachment Unit Interface, HDMI, PDMI, DisplayPort, Mini DisplayPort, DMS-59, FireWire FIREWIRE™, USB-A, USB-B, parallel ATA, serial ATA, and XLR connectors; Coaxial RF connectors, such as BNC, C, F, GR, N, SC, TNC, UHF, TV aerial plug, miniature, subminiature and micro types of these; other connectors, such as Banana, RCA, TS, TRS, TRRS (2.5 mm, 3.5 mm, 6.35 mm versions; i.e. as used for IPOD™ and iPhone), and AV Multi (from SONY™); memory card slots, such as PCMCIA flash memory cards, COMPACTFLASH™ Card, MiniCard, SMARTMEDIA™ Card, xD-Picture Card, MEMORY STICK™, SecureMMC, Secure Digital cards (i.e. SD, miniSD, microSD), SIM card, Integrated circuit cards (credit card sized), USB FlashCard, floppy disk, etc. This recitation of connector types is not exhaustive, and other types of connectors, now known or to be developed, may also be useful in the present invention.

Figure 5:
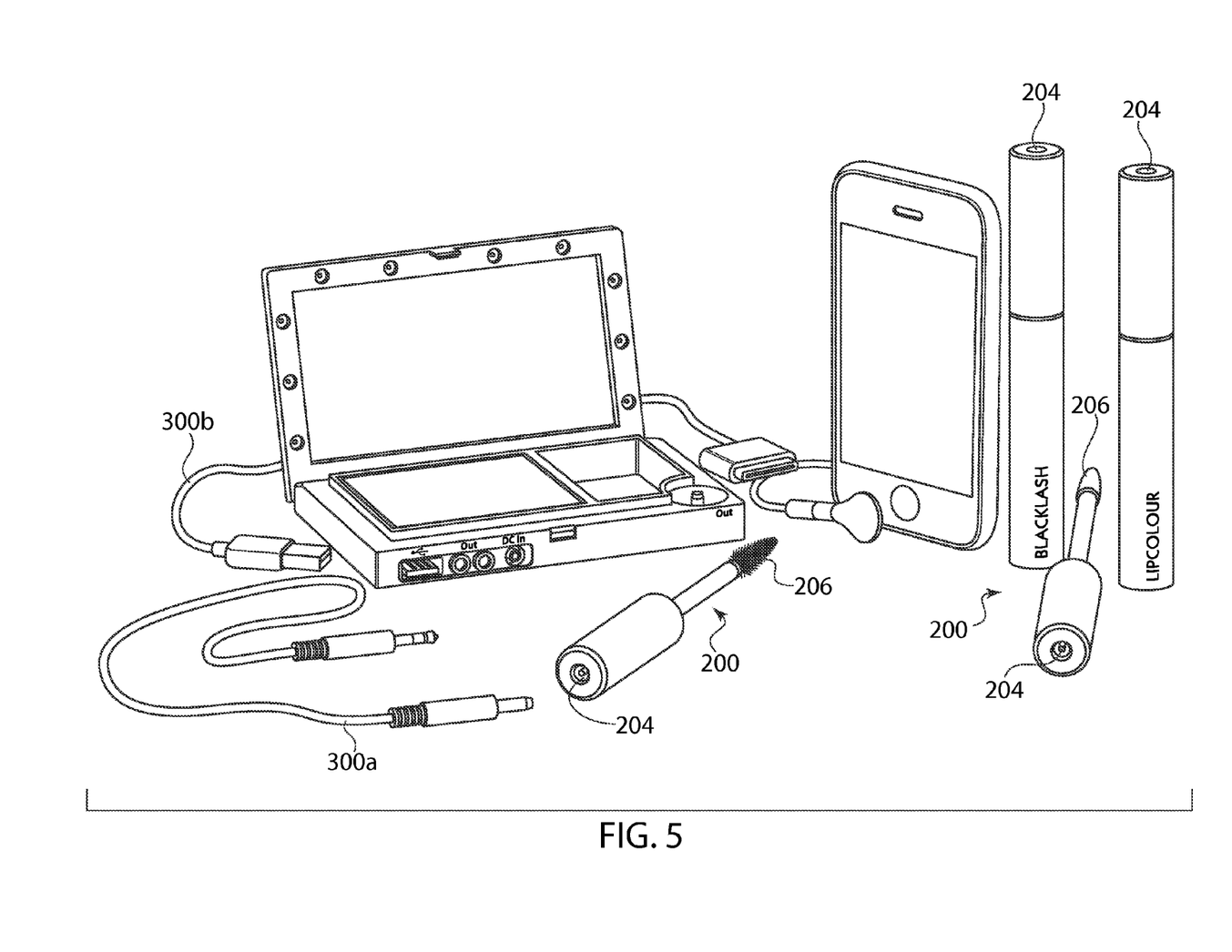
FIG. 5 shows a number of cosmetic implements and electronic accessories that may be interfaced with a Universal Docking Station Compact according to the present invention.

In general, the connectors on the compact may be designed to mate directly to an interfacing device. For example, USB port (101) may receive a USB flash drive directly. Or, for example, the male output power connector (104) in the surface (14) of the base (10) may be designed to insert directly into a female connector (204) located in the base or handle of an electronic device. Alternatively, some or all of the connectors on the base may be mated to an interfacing device through one or more intermediate cables, such as those shown in FIG. 5 (300a, 300b).

The number and type of interfaces provided on a cosmetic compact according to the present invention is a design choice, but it is preferable if a compact according to the present invention has at least one output electrical power connector, at least one input electrical power connector, and at least one data or signal connector (preferably a connector that supports digital data transfer). While digitized signals may be more common nowadays, one or more interfaces that are capable of supporting an analog signal may also be included.

The types of devices that may interface with a Universal Docking Station Compact of the present invention is also a design choice. Preferably, the compact is capable of forming an electrical interface with at least one cosmetic or personal care device, and at least one handheld non-cosmetic digital device. Examples of cosmetic devices that require an electrical interface include vibrating mascaras, rotating mascaras, heated mascaras, heated lip glosses, heated acne pens, heating or cooling treatment applicators, cosmetic devices that produce light and/or sound, or that process analog or digital signals, etc.

We also envision that a cosmetic compact according to the present invention can be wireless enabled, either with an integrated or plug-in adapter, suited to any desired protocol, such as Wi-Fi or Bluetooth.

Charging Electronic Cosmetic and Personal Care Devices

Another aspect of the invention includes electronic cosmetic and/or personal care applicators or devices, for use with the docking station compact, herein described. While various electronic cosmetic articles are known, such as vibrating mascaras, rotating mascaras, heated mascaras, heated lip glosses, heated acne pens, heating or cooling treatment applicators, cosmetic devices that produce light and/or sound, or that process analog or digital signals, etc, it is common for those articles to be powered by a battery. When the battery is depleted, it must be replaced or recharged. If the depleted battery can be recharged, it may take several hours to recharge the battery, as is typical of the recharging operation. Also, there is a limit to the number of times a battery can be recharged. Also, batteries add a lot of weight to the device, and take up a lot of space, which may not be desirable. Thus, while a docking station compact of some embodiments of the present invention may be implemented to work with devices having rechargeable batteries, preferred embodiments use electronic cosmetic devices that are equipped capacitors instead of batteries. An electronic cosmetic device that uses a capacitor is able to overcome the limitations of batteries. One benefit of having a capacitor is that it can be charged and recharged within a few seconds or minutes. Unlike a battery, however, a fully charged capacitor may give only get a few applications or only several minutes of use, before it has to be recharged. Surprisingly, in the present situation, this is not a significant drawback. There are at least two reasons for this: first, electronic cosmetic devices are not used for extended periods of time (i.e. an application make take several seconds to 2-3 minutes); second, recharging is relatively fast (i.e. on the order of seconds to 2-3 minutes, which may be about 20 to 200 times faster than a rechargeable battery, depending on the battery). Furthermore, compared to a battery, the capacitor can be recharged indefinitely. Also, the capacitor is relatively light, compared to a battery of comparable size. And, for a given level of power, the capacitor is significantly smaller than a battery. Because of this, a cosmetic device that utilizes a capacitor as its current source may have more flexibility in its design than a cosmetic device that uses a battery. Also, it may be that a capacitor can be disposed in normal household waste, even in locations where batteries must be receive special handling for disposal.

Capacitors that are preferred in the present invention are suitable for rapid charging and discharging and effective over a temperature range of at least 0° C. to 40° C., more preferably −20° C. to 50° C. Preferred for the present invention are electric double-layer capacitors (EDLC), also known as supercapacitors or ultracapacitors. Supercapacitors have a relatively high energy density, typically on the order of thousands of times greater than conventional electrolytic capacitors. EDLCs also have a much higher power density than conventional batteries or fuel cells of comparable size. Examples of EDLC capacitors that are commercially available are those marketed by Maxwell Technologies: for example, the PC10 series (2.5V DC, 10 F), HC series (2.7V DC, 5 F-150 F), and D Cell® series (2.7V, 310 F or 350 F). Nichicon (JP) markets the EVer CAP brand of EDLC with rated voltages of 2.5 VDC and 2.7 VDC, and capacitances from about 0.47 F to 4000 F.

In selecting a capacitor for use in the present invention, the most important factors are rated capacitance, rated voltage and size of the capacitor. Preferably, a capacitor will be not much larger or about the size of a typical cylindrical cell battery, such as are presently used in electronic cosmetic devices. More preferably, a capacitor will not be much larger or about the size as a button battery, such as are often used in hearing aids. Preferably, the capacitance of a capacitor that is suitable for use in an electronic cosmetic device that is to be used with the docking station compact as herein described, is from about 1 to about 200 Farad (F); more preferably, from about 10 F to about 100 F; even more preferably from about 20 F to about 50 F; and most preferably from about 30 F to about 40 F. Preferably, the rated voltage of the capacitor is from about 1.5 VDC to about 9 VDC, more preferably, from about 2 VDC to about 6 VDC, more preferably from about 2.5 VDC to about 3.5 VDC. We have discovered that such capacitors are able to provide sufficient power for at least one intended use of a device, whether the power is used to heat an applicator, heat a product, vibrate an applicator, rotate an applicator, shine a light, or various other purposes related to personal care treatment. Capacitors meeting the specifications defined above can be charged or recharged within the time frames described above. Unlike a battery, the capacitor will outlast the personal care device, reducing waste.

Figure 6:
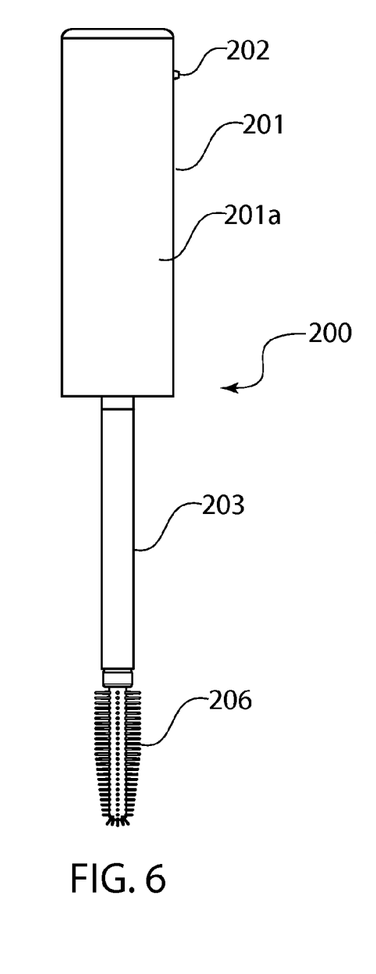
FIGS. 6-8 show one embodiment of an electronic cosmetic device for use with a universal docking station compact according to the present invention.
Figure 7:
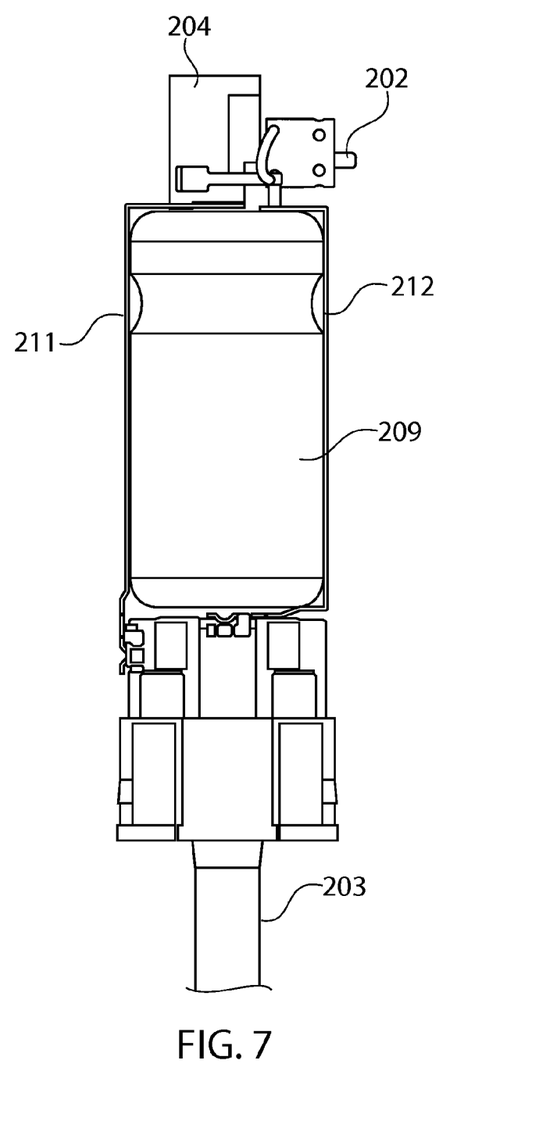
Figure 8:
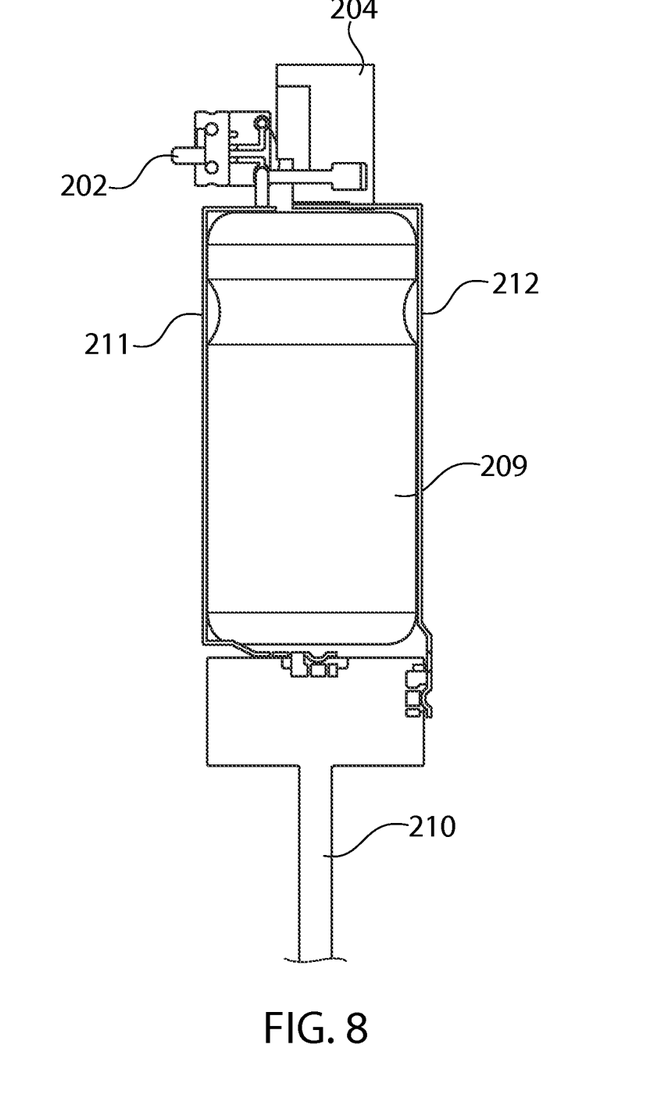

One embodiment of an electronic cosmetic device for use with a universal docking station compact according to the present invention, having an EDLC capacitor, is the heating mascara applicator (200) shown in FIGS. 6-8. In FIG. 6, the heating applicator comprises an elongated structure comprising a proximal end and a distal end. Toward the proximal end is a handle (201) for grasping by a user, which also serves as a housing for a capacitor (209) and some associated circuitry. Attached to the handle and moving toward the distal end of the applicator is a hollow stem (203). Further toward the distal end, is an applicator head (206), shown in the figures as a molded brush. In this embodiment, the bulk of the electronic circuitry is carried on a printed circuit board (PCB) (210 in FIG. 8), including specifically, one or more heat generating elements. The PCB is an elongated structure that passes through the hollow stem, from the capacitor (209) (closer to the proximal end of the applicator) to the applicator head (nearer the distal end of the applicator). FIG. 7 shows the applicator handle with the overshell (201a) removed. The capacitor (209) is visible. FIG. 8 shows the applicator with the overshell and stem removed. The capacitor and printed circuit board (201) are visible. Some of the associated circuitry is also visible in FIGS. 7 and 8. In FIG. 8, the capacitor has electrical contact with the PCB through conductors 211 and 212. The circuit also includes an on-off switch (202) for a heating circuit of the applicator. A unique feature of the present applicator is the female power mating connector (204) that is accessible on an exterior surface of the handle (seen more clearly in FIGS. 4 and 5), which forms part of a recharging circuit of the applicator.

Preferably, the universal docking station compact according to the present invention, is able to recharge the capacitor housed in the heating mascara applicator (or other electronic cosmetic device) when the capacitor is low or depleted. This is a significant advantage of the present invention over known electronic cosmetic devices and known compacts. A consumer who would otherwise be unable to use her electronic cosmetic device, may pull out of her handbag, a compact according to the present invention, complete a power connection between the compact and the cosmetic device, and within seconds or minutes be able to use the recharged device. Completing a connection between the compact and the cosmetic device may comprise plugging one end of a power cable (or power/data cable) into a port accessible at a surface of the compact, while the other end of the cable is inserted into a port accessible on a surface of the cosmetic device (see FIG. 5). Alternatively, completing a connection between the compact and the cosmetic device may comprise the step of plugging a male output power connector that is accessible at a surface of the base (10) into a mating female connector accessible on a surface of the cosmetic applicator (200). For example, in the embodiment shown in FIG. 4, a male output power connector (104) is accessible at the top surface (14) of the base, only when the cover (40) is in an opened position. A female input power connector (204) is accessible at one end of the applicator, and is able to interface with the male output power connector (104). In this configuration, the cover (40) of the compact cannot be closed. Optional space (105) is provided to hold the cosmetic applicator device securely in place while recharging (see FIG. 1).

Once an electrical connection between the compact and electronic cosmetic device is established, electrical power is able to flow from the power source of the compact to the capacitor(s) of the cosmetic device, such that the power is stored in the capacitor(s) of the cosmetic device. Preferably, the capacitor(s) are fully charged in less than two minutes, more preferably, less than one minute, even more preferably les than thirty seconds, and most preferably less than fifteen seconds. The actual time to fully recharge the capacitor depends on the size of the capacitor, the degree of depletion of the capacitor, the size of the power source, and the degree of depletion of the power source.

An electronic cosmetic device according to the present invention comprises any electrical hardware required to ferry power from a port that is accessible on a surface of the cosmetic device to a capacitor of the cosmetic device, such that the power stored in the capacitor increases. For example, the hardware may include insulated wiring and/or printed circuit elements located on a printed circuit board. The electronic cosmetic device may include a means of indicating when the device is charging and/or when the device is fully charged and/or when the device is low on charge. For example, one or more indicator lights may be present on the cosmetic device.

An electronic cosmetic device according to the present invention also comprises any electrical hardware required to form a switched electric circuit that includes the capacitor as a source of electric power. For example, an electric circuit may comprise the capacitor (201), a switch (202) that is accessible from the outside of the electronic cosmetic device, a motor and/or heating element and/or cooling element, one or more LEDs, and electrical conductors between various elements. Any type of electronic component may find use in such a cosmetic device; such as switches, cables, capacitors, resistors, thermistors, voltage regulators, transformers, semi-conductors, diodes, transistors, piezoelectric devices, amplifiers, receivers, oscillators, crystals, resonators, thermostats, rheostats, fuses and breakers, terminals, connectors, inductive devices, protection devices, transducers, sensors, detectors, network devices, antennas, integrated circuits, optoelectronic devices, motors, magnets, power sources, etc.

Charging Consumer Handhelds

Consumer electronic devices known as "handhelds" also utilize a rechargeable power source. Unlike electronic cosmetic devices, handhelds would be inconvenient if they had to be recharged after just a few uses or after just several minutes of use. For this reason, handhelds utilize a rechargeable battery, rather than a capacitor. Preferably, the universal docking station compact according to the present invention, is able to supply power to run a consumer electronic handheld for an extended period of time, preferably when the battery of the handheld is depleted. This is a significant advantage of the present invention over known cosmetic compacts. A consumer who would otherwise be unable to use her cell phone, or iPod or PDA, for example, may pull out of her handbag, a compact according to the present invention, complete a power connection between the compact and the handheld, and thereby continue to use the otherwise useless handheld device.

More preferably, a universal docking station compact according to the present invention, is able to fully recharge a depleted battery in a consumer electronic handheld device. This is a significant advantage of the present invention over known cosmetic compacts. A consumer who would otherwise be unable to use her Kindle, or Gameboy or camera, for example, may pull out of her handbag, a compact according to the present invention, complete a power connection between the compact and the handheld, put the recharging device and compact back into her handbag, and carry both the recharging device and recharger as she goes about her business.

In preferred embodiments, a universal docking station compact according to the present invention, is able to fully recharge a depleted battery in a consumer electronic handheld device, and simultaneously provide power to run the device.

The Power Source of the Compact

Figure 9:
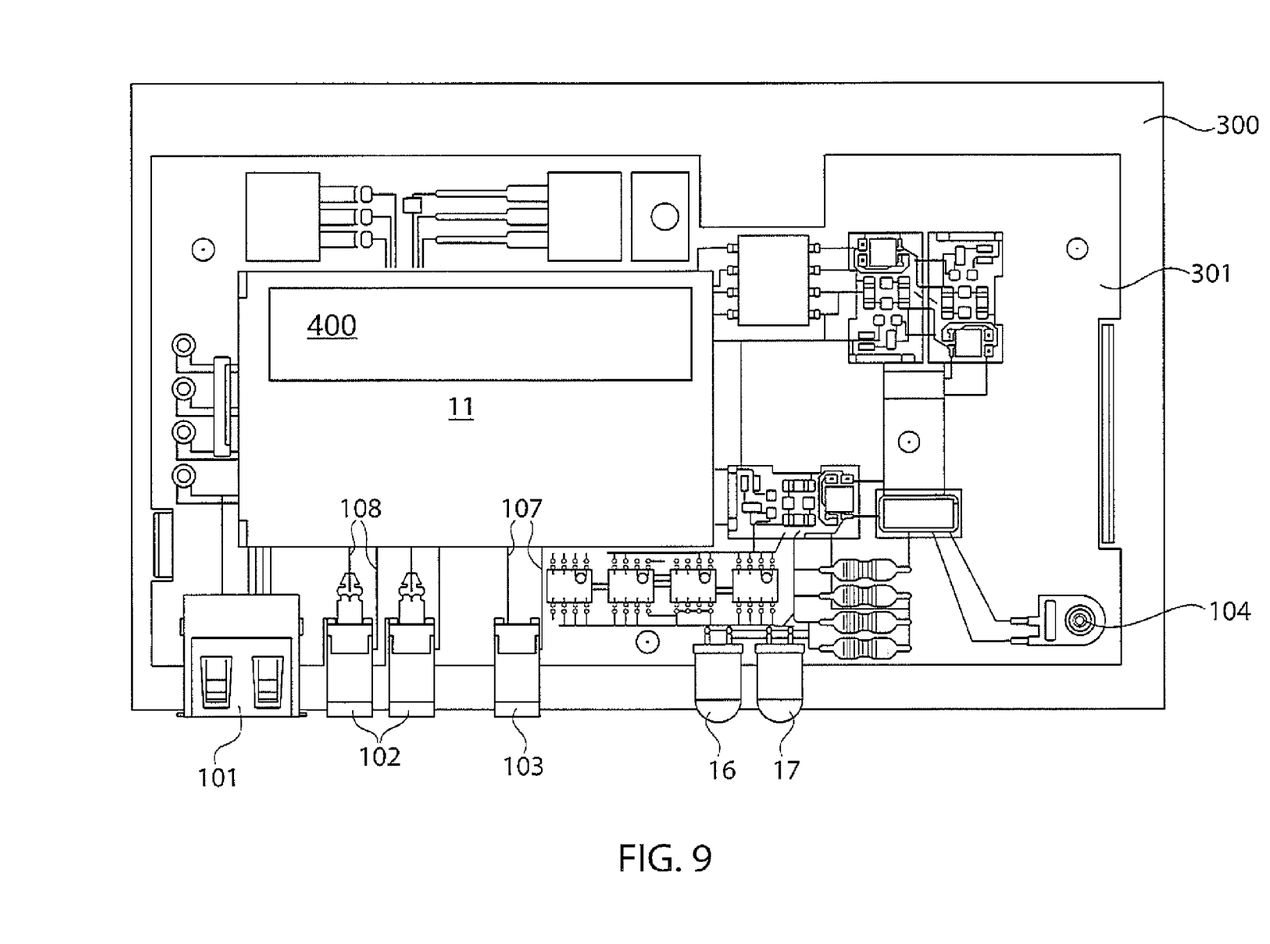
FIG. 9 shows one possible arrangement of electronic components on a circuit board that is useful in certain embodiments of the present invention.

Referring to FIG. 9, a compact (10) comprises a power source (11). The power source may be housed for example within the base (12), preferably underneath one or more recesses in the top surface (14) of the base, hidden from view. Alternatively, the power source may be housed in the cover (40). Preferably, and most conveniently, the power source resides on a circuit board (301), where the majority of electronic elements are also located.

Preferably, the power source is a rechargeable electric charge storage device having at least one set (positive and negative) of input terminals (107) and at least one set (positive and negative) of output terminals (108). Preferably, the output terminal(s) of the charge storage device are electrically connected to one or more electric power connectors that are accessible at a surface of the compact (such as output jacks (102) in FIG. 9). Recharging the power source may imply removing the power source from the compact and replacing it in the compact after it has been recharged. However, it is preferable if the input terminal(s) of the charge storage device are electrically connected to one or more electric power connectors that are accessible at a surface of the compact (such as input jack (103) in FIG. 9).

To be effective, the power source must provide an electric capacity (Amp-hours) that is substantially larger than the devices that it will recharge. Electronic personal care and electronic cosmetic devices as described above will be recharged in seconds or minutes. As for consumer handhelds, preferably the rechargeable power source of the compact is able to recharge them in less than 8 hours, more preferably, less than 6 hours, even more preferably, less than 4 hours, and most preferably less than 2 hours. Furthermore, the power source of the compact should itself be rechargeable, in a similar time frame. This way, it may be recharged overnight (or at any convenient time), when it is less likely to be needed. How often the power source of the compact needs to be recharged depends on frequency of use. Preferably, the power source of the compact does not need to be recharged more than once per day. This way, it may be recharged overnight, or at any time when it is less likely to be needed.

Some handheld devices, such as mobile phones, operate at a nominal voltage of about 3.7V and current of 1,400 mA. Preferably, the charge storage device (11) in a Universal Docking Station Compact according to the present invention is able to supply the required voltage, at a significantly higher amperage. In some embodiments of the present invention, the charge storage device or power source of the compact is a rechargeable lithium-ion battery, with a nominal voltage of at least 3.7 VDC and at least 2,800 mA. For devices requiring less voltage, a download converter can used to supply the appropriate voltage. Some rechargeable lithium-ion batteries available today may be fully recharged in 45 minutes or less, while some brands can reach 90% of full charge within ten minutes, however, cost becomes a factor to consider. Among useful rechargeable batteries are ones that conveniently fit into the base or cover of the universal docking station compact, and that have an output voltage that is at least as great as the devices that one expects to power or recharge. Furthermore, useful rechargeable batteries are preferably capable of outputting at least 2,800 mA, more preferably at least 3,600 mA, even more preferably at least 4,200 mA. Furthermore, useful rechargeable batteries are able to be fully recharged in less than 8 hours, preferably less than 6 hours, more preferably less two hours and most preferably less than 1 hour.

The Circuit Board

Preferably, a majority of electrical components including the power source (11), reside on a circuit board (301). The board itself may rest on a substrate (300). The circuit board, with or without cover, may be housed within the base (12), preferably underneath one or more recesses in the top surface (14) of the base, hidden from view. Alternatively, the circuit board may be housed in the cover (40). FIG. 9 shows one possible arrangement of electronic components on a circuit board that is useful in certain embodiments of the present invention. Any type of electronic component may find use in various embodiments of the present invention, such as: switches, cables, capacitors, resistors, thermistors, voltage regulators, transformers, semi-conductors, diodes, transistors, piezoelectric devices, amplifiers, receivers, oscillators, crystals, resonators, thermostats, rheostats, fuses and breakers, terminals, connectors, inductive devices, protection devices, transducers, sensors, detectors, network devices, antennas, integrated circuits, optoelectronic devices, motors, magnets, power sources, etc. In particular, preferred circuit boards comprise components for processing digital signals, such as one or more control processing units (CPUs), memory registers, and digital signal transfer busses.

At a minimum, a circuit board used in the present invention has two types of electric circuits, at least one of each type. A first circuit, referred to as a loaded circuit, includes one or more electric loads that drain power from the battery (11) when current is flowing through the load. For example, the load could be a handheld device, such as a cell phone, that draws power from the battery from output jack (102), or a heating cosmetic applicator that draws power from output plug (105). The first circuit may also include a switch that is capable of interrupting the flow of current between the battery and the load. When the switch is in a closed state, power is drained from the battery and current flows through the loaded circuit. When the switch is in an opened state, power is not drained from the battery, and current does not flow through the loaded circuit. Preferably, the switch is accessible to a user. Preferably the switch is located on an outer surface of the device. All manner of switches known in the electronic arts may be useful in various embodiments of the present invention. Some non-limiting examples include: toggle switches, rocker switches, sliders, buttons, rotating knobs, touch activation surfaces, magnetic switches and light activated switches. Also, multi-position switches or slider switches may be useful if the electric load is capable of multiple output levels. A manual switch may be located anywhere that it is directly accessible.

Recharging Circuit

A second circuit is a recharging circuit. The battery (11) is able to establish electrical contact to a power reservoir for recharging the battery (11), and the recharging circuit is only completed when the device is accessing the power reservoir. Generally, the power reservoir will be external to the device, and a connection may have to be made to complete the recharging circuit. The connection may be physical contact or induction type. In general, physical contact power connections are formed as two mating connectors, a male (or plug) and a female (jack or port). Connectors of either type may be accessible on any surface of the device that is convenient. Various types of DC power connectors known in the electronic arts, for example, banana, TRS, RCA, and EIAJ. This recitation of connector types is not exhaustive, and other types of connectors, now known or to be developed, may also be useful in the present invention.

As described, the battery of the compact must be periodically recharged. Even though a Universal Docking Station Compact according to the present invention needs to be recharged often, the recharging may be done at down times, when the user is at home, for example. The rest of the time, the compact retains its character as a portable docking and recharging station for various electronic devices.

In general, there are two types of recharging: conductive (wired) and inductive (wireless). A compact according to the present invention may be designed for use with either type. Conductive charging, the more conventional of the two, requires direct electrical contact between the battery and the charger. In contrast, inductive charging does not use direct electrical contact. Rather, it transfers energy between a power source and the battery in the compact through an electromagnetic field. For example, an induction coil in the power source is used to create an alternating electromagnetic field. When a universal docking station compact according to one or more embodiments of the present invention is brought within this alternating electromagnetic field, electric current is induced in a second induction coil located in the compact. This current is stored in the battery of the compact.

Figure 10:
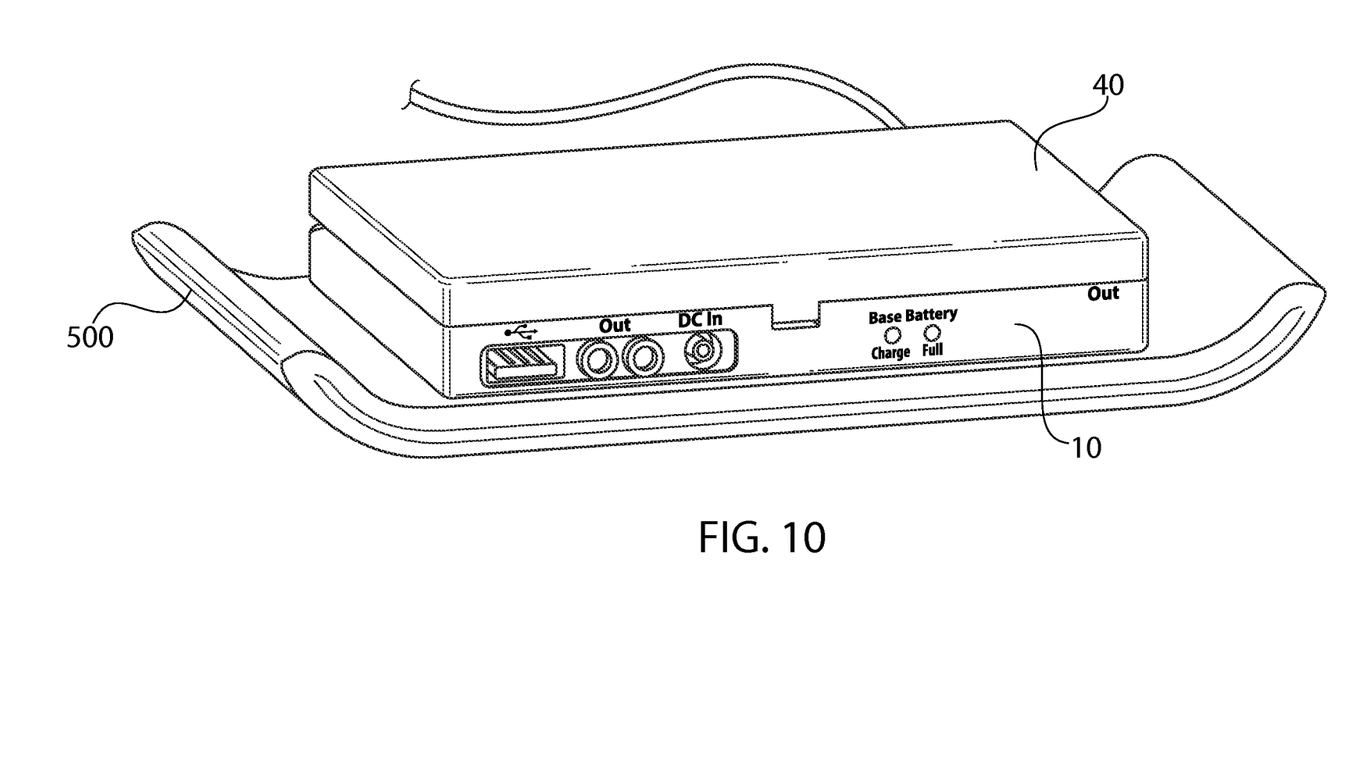
FIG. 10 shows the compact being recharged wirelessly, on a charging pad. The wire shown is for the charging pad, not the compact.
Figure 11:
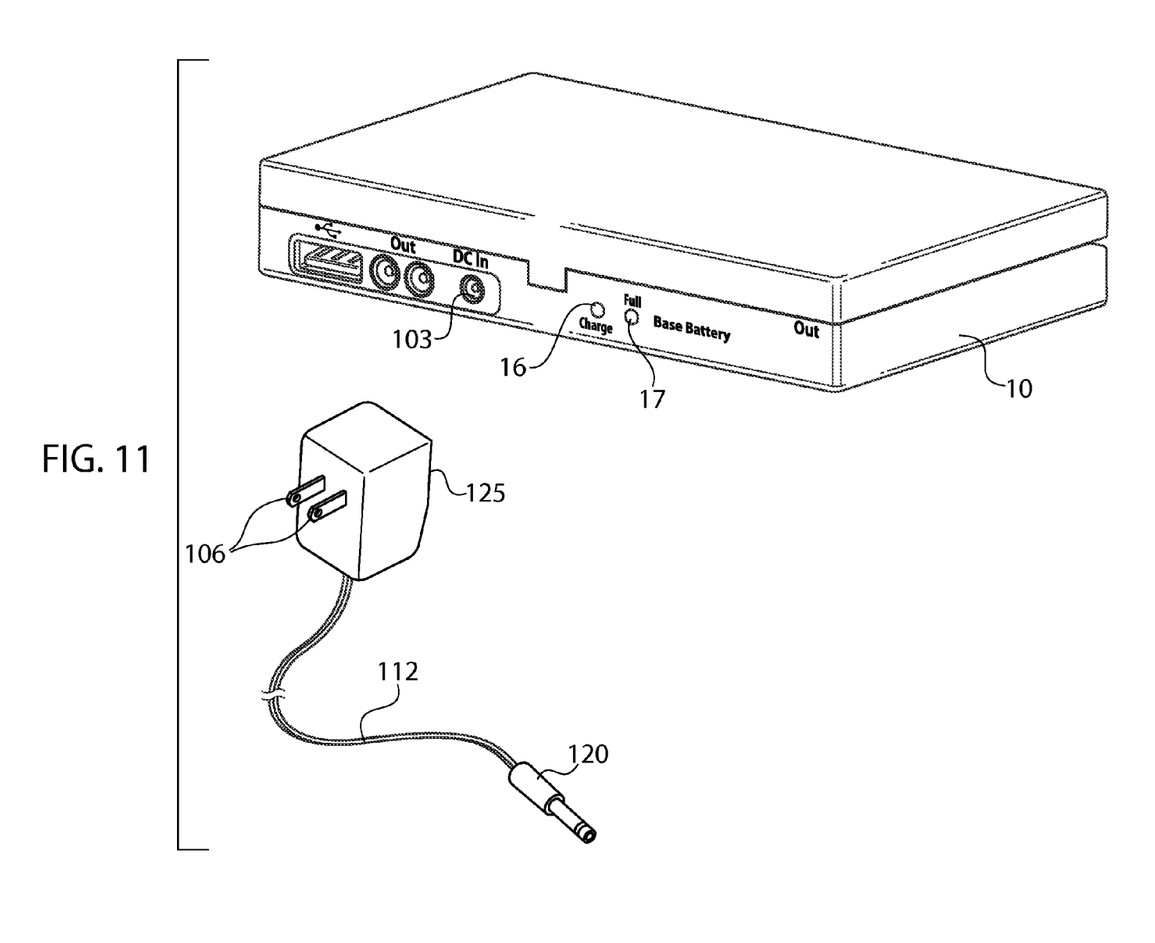
FIG. 11 shows an AC-DC adapter that may be used to recharge a docking station compact according to the present invention.

Either type of recharging, wired or wireless, may be provided through a charging base. In the case of inductive charging, the charging base may be in the form of a charging pad (500, in FIG. 10). In the case of conductive charging, the compact itself could be reposed in a recharging base designed for the purpose. Alternatively, a Universal Docking Station Compact according to the present invention may be provided with an electrical plug for drawing power from a household or other standard current source, no recharging base being needed. In FIG. 11 for example, Type A plug (106) located at one end of cable (112) connects to ordinary residential electrical power; AC to DC converter (125) transforms to voltage to a DC voltage and current that is appropriate for the battery (11), and the transformed power is passed through mating connector (120) into input electric power connector (103) of the compact (10). From there, the electrical power travels along the recharging circuit of the compact until it reaches the battery, where its is stored. Another alternative is to use a computer to charge the battery of the compact. For example, a compact equipped with a male type connector may be plugged directly into a female connector on a computer. By computer we mean any type, such as, personal computer, MAC, notebook, laptop, etc. The compact draws current from the computer through the connection, and stores it in the battery. For example, the compact may have a USB male connector and a personal computer may have a USB female connector. Other types of connectors may also be useful for this purpose.

A generic description of one embodiment of a recharging circuit is as follows. When plug (106) is connected to a power reservoir, and when a male-type electrical connector (120) is inserted into input electric power connector (103), electrical contact is established between an external power reservoir and the battery (11), such that the battery can receive and store electric charge. When the battery is fully recharged, flow of current stops. When charging is completed, the male-type connector can be removed from the electrical port. Depending on the battery, a full recharging may take about 1 hour to about 10 hours. From a consumer point of view, a shorter time is preferred, although faster charging batteries are generally more expensive. The recharging circuit may optionally include a switch, such that actual charging only occurs when the switch is closed. Optionally, the recharging circuit may include one or more indicator lights that signal one or more conditions of the recharging. For example, there may be a light (16) that indicates when charging is occurring or that indicates the degree of charge on the capacitor or that indicates that charging has stopped (17).

Optional Features

Any number of optional features may be included various embodiments of a compact according to the present invention. Any number of features may be integrated into the compact or may be facilitated by a power and/or digital interface to the compact. For example, the compact may have one or more internal memory registers, either volatile (i.e. RAM) or non-volatile memory. The internal memory may be capable of any and all manner of file system architecture, such as File Allocation Table (FAT), for example. One use of integrated memory may be for a user to store her cosmetic shopping habits and preferences. This way, at a store counter, the memory can be accessed to assist in the shopping experience. Alternatively, an interface to a memory device may be provided, as discussed above.

Above, we have described interfacing a compact according of the present invention and a computer, for drawing power. However, through the same types of connections, data may also be exchanged between the a compact and a computer. Therefore, the present invention also contemplates software or programming code that facilitates any of the power, data and signal connections that the compact may make, as well as software that facilitates the user's experience in uploading and/or downloading data, capturing and/or reviewing data. A software program or programming code that controls the movement of data into and out of the compact may reside on a computer to which the compact physically links, or it may reside in the compact itself, or it may reside on a digital device that is accessible through a network, like a LAN or the internet.

The software program or programming code that controls the movement of data into and out of the compact may perform certain functions automatically when certain conditions are met. The program may also perform certain functions as demanded by a user. For example, when the compact and a computer form a data connection, the compact may automatically instruct the computer to launch a web browser and open a particular web page. That web page might be, for example, a commercial web site of the manufacturer of the compact. Once at the web site, the resident program may automatically download files, data or information from the compact to the website and/or automatically upload files, data and/or information from the website. Optionally, once a link between the compact and a computer and/or web site is established, the compact screen or computer screen may display a menu of choices for the user. The software is design to respond to choices made by the user, to complete some programmed task.

The software program or programming code that controls the movement of data into and out of the compact may be implemented in any programming language that is suitable for handhelds and computers. The program may run in a distributed computing environment, such as a local area network or the internet, or in a non-distributed environment, such as a stand alone kiosk (designed to interface with the compact). In general, the program may be implemented in a compiled or interpreted programming language, with or without the generation of object code. At any given time, programming code may reside in volatile memory, non-volatile memory or both. Optionally, the program is implemented in a programming language that supports touch screen input, and screen and printer output. The program proper makes use of control flow statements, such as selection and loop; branching structures, such as conditional and/or unconditional redirects, subroutines and termination; and interrupt algorithms, such as error handling. Various programming paradigms may be useful in implementing a program according to the present invention, however, an event driven programming approach may be preferred, in which user input triggers one or more event-handlers. Other potentially useful paradigms include object oriented, structured, imperative and functional paradigms. Additionally, as for handhelds in general, larger applications and/or smaller applets may be developed, that extend the functionality or enhance the experience of using a Universal Docking Station Compact according to the present invention.

Many known programming languages may be useful to implement one or more portions of the program. Particularly useful may be ACTIONSCRIPT™ OBJECTIVE-C™, JAVA™, JAVASCRIPT™ PHP/MySQL™, and any of the MICROSOFT™.NET family of languages. Markup languages such as HTML, XML, XHTML and others, now known or to be developed, may also be useful in deployment of the application.

Optionally, a compact according to the present invention may have a heating and/or cooling function, which can be used to heat up or cool down a cosmetic or treatment product. One method of achieving heating and cooling is through one or more thermoelectric effects. For example, in the Peltier effect, an electric current flows across a junction from a first metal to a second, dissimilar metal. Discontinuities at the junction cause heat to be removed from the second metal (thus cooling it), and transferred, against a temperature gradient, to the first metal (thus heating it). If the direction of current is reversed, then the effect is also reversed. Thermoelectric heat pumps based on the Peltier effect are known, and take the form of solid-state devices that transfer heat from one side of the device to the other, heating one side and cooling the other. For example, Peltier devices that are powered from a USB port, and used to cool or heat drinks, are commercially available. A compact according to the present typically comprises a receptacle, filled with product. The receptacle may be a metal pan, for example. A Peltier solid state device (400) may be placed under the receptacle. Power can be supplied by the battery (11) of the compact, and the circuit may have an on-off switch. Optionally, the circuit may have a temperature sensor, a means of alerting the user when the product has reached a certain temperature, and an automatic shut off capability.

Optionally, a compact according to the present invention may have a mirror (70), which compacts often do. Typically, the mirror may be located on an the interior surface of the cover, although this is not required. Furthermore, a compact according to the present invention may also have an electronic screen, powered by the battery of the compact. The mirror and the screen may be separate elements. However, preferably, the mirror and screen are implemented as one display element that is capable of operating in two modes. When the display is off, it functions is a regular mirror. When the display is on it becomes a screen. For example, U.S. Pat. No. 6,311,077 describes a cell phone compact that has a display that is able to operate in either of two modes: as a mirror or as a screen for displaying information related to the operation of the cell phone. Preferably, when used in screen mode, the display of the present invention has functionalities that are similar to any known handheld device, such as a cell phone, PDA, mp3 player, BLACKBERRY™, IPAD™, etc. A compact according to the present invention may be similarly equipped, and any advances in display and screen technology may also be integrated into the present invention. This screen can display signals received from an external source, for example, from the internet via a wireless capability, or for example, from a built-in or plug-in memory device. External signals that may be displayed on the screen include, for example, advertising messages in the form of pictures, text and video, public service messages, free and subscription media services. Internal signals include personal photos, videos, and text, for example. Optionally, the screen may be enabled to respond to touch, as with a finger or a stylus.

In some embodiments, a wireless capability may be integrated into the compact or it may be effected with a wireless adapter plugged into an available port of the compact. Such a capability would allow the compact to receive email and to surf the internet and worldwide web. It would be entirely possible for commercial vendors to send email promotions to a compact according to the present invention. Or, as a result of wandering into a local area network, the present invention includes a compact that is able to notify its owner that she has moved within a certain distance of a particular set of a particular location, such as a certain commercial establishment. Or the same notification may be triggered by a GPS enabled compact.

Optionally, a keyboard, a digital pointing device, a digital selection device or a display screen may be integrated into an exposed surface of the compact, or any of these may be interfaced to an available port on the outside of the compact, either by plug-in or wireless connection.

In some embodiments, one or more audio speakers (72) may be integrated into the compact, or a power and digital interface to an external speaker may be provided. The speaker may be for music and voice communications, or for system alert sounds. A tuner for free and/or subscription radio and/or television and/or other media may be integrated into the compact. A receiver for satellite radio and TV may be integrated into the compact or interfaced to an available port on the outside of the compact, either by plug-in or wireless connection.

Some embodiments of the invention may be provided with a digital image capture capability and/or digital video and audio capture capability (73). A video viewing and/or playback capability may also be included.

Cosmetic compacts comprising a storage area are known. The storage area (60) may be used for an applicator, for example. Some embodiments of the present invention may comprise a storage area for electronic and/or digital equipment. For example, a sliding drawer may be designed to house a patch cord or a USB flash drive. Or, for example, an array of slots in the main compartment of the compact may hold mini SD flash drives.

It is also known to make compacts with completely removable trays (for example, U.S. Pat. Nos. 5,605,167 and 6,002,651), hermetic seals (for example, U.S. Pat. Nos. 5,842,486 and 6,199,559), transparent covers or covers with windows or lenses (for example, U.S. Pat. Nos. 6,227,208; 6,769,438 and 2004/0221866), snap-off covers to prevent breakage if rotated too far (for example, U.S. Pat. No. 5,638,838), and interior lighting (for example, U.S. Pat. No. 4,126,145). Compacts according to the present invention may be equipped with any of these features. For example, FIG. 1 shows a number of lighting elements (71) in the interior surface (44) of the cover (40). For example, the lighting elements may be an array of LEDs surrounding the mirror (70). The lighting elements are powered by the power source of the compact (i.e. lithium-ion battery). One or more of the lighting elements may turn on automatically when the compact is opened and/or turn off automatically when the compact is closed and/or a user control may be provided to allow a user to turn the lights on and/or off, at will.

What we claim is:

1. A cosmetic compact comprising:
   a base, wherein one or more portions of the base are adapted for holding one or more personal care products;
   a cover that is moveable with respect to the base, between an opened position and a closed position, such that in the closed position, the personal care product is not accessible, and in the opened position, the personal care product is accessible;
   a rechargeable electric charge storage device;
   at least one output electric power connector that is electrically connected to the charge storage device, and that is accessible at a surface of the compact, such that power flows from the charge storage device to the output power connector;
   at least one digital or analog signal connector accessible at a surface of the compact, selected from the group consisting of RF, such as BNC, C, F, GR, N, SC, TNC, UHF, TV aerial plug, miniature, subminiature and micro types of these, D-subminiature, DVI, mini-DVI, micro-DVI, DIN, Mini-DIN, SCART, D-Terminal, VGA/Mini-VGA, Banana, RCA, TS, TRS, TRRS, such as the 2.5 mm, 3.5 mm, and 6.35 mm versions, AV Multi, memory card slot, APPLE™ Attachment Unit Interface, HDMI, PDMI, DisplayPort, Mini DisplayPort, DMS-59, FIREWIRE™, USB-A, USB-B, parallel ATA, serial ATA, XLR, and Registered Jack-type connectors; and
   an electronic personal care device selected from a vibrating mascara, rotating mascara, heated mascara, and heated lip gloss, having an input power connector that is able to interface with one or more of the output electrical power connectors, wherein the electronic personal care device comprises an electric double-layer capacitor that is able to be recharged by the rechargeable electric charge storage device.

2. The compact of claim 1 further comprising an input electric power connector that is electrically connected to the charge storage device, and that is accessible at a surface of the compact.

3. The compact of claim 2 further comprising at least one output power connector that is accessible only when the cover is in an opened position.

4. The compact of claim 3 further comprising an electronic personal care device having an input power connector that is able to interface with that output power connector that is accessible only when the cover is in an opened position.

5. The compact of claim 2 further comprising at least one power or data connector that is able to assume at least two positions with respect to the compact.

6. The compact of claim 2 wherein the rechargeable electric charge storage device is a lithium-ion battery having nominal voltage of at least 3.7 VDC and at least 2,800 mA, and the input electric power connector can be used to recharge the battery.

7. The compact of claim 6 further comprising at least one CPU, at least one volatile memory register, at least one non-volatile memory register or any combination thereof.

8. The compact of claim 7 further comprising programming code stored in volatile memory, non-volatile memory, or both.

9. The compact of claim 8 wherein the programming code is written in one or more of ACTIONSCRIPT™, OBJECTIVE-C™, JAVA™, JAVASCRIPT™, PHP/MySQL™, and any of the MICROSOFT™ .NET family of languages, HTML, XML or XHTML.

10. The compact of claim 7 that is able to interface with a computer to exchange power and/or data.

11. The compact of claim 10 wherein the compact instructs the computer to launch a web browser and open a particular web page.

12. The compact of claim 7 having a wireless capability that allows the compact to receive email and/or surf the worldwide web.

13. The compact according to claim 2 further comprising a receptacle filled with product located in the base, and a Peltier solid state device placed under the receptacle.

14. The compact of claim 2 further comprising any of the following: a mirror, a display screen, one or more LEDs, one or more audio speakers, an audio capture capability, and a storage area.

* * * * *